Dec. 30, 1969  G. T. GOUGH  3,486,605
BUCKET CONVEYORS
Filed Dec. 26, 1967  4 Sheets-Sheet 4

United States Patent Office 3,486,605
Patented Dec. 30, 1969

3,486,605
BUCKET CONVEYORS
George Terah Gough, Newcastle, England, assignor to Gough Econ Limited, Hanley, Stoke-on-Trent, Staffordshire, England, a corporation of the United Kingdom
Filed Dec. 26, 1967, Ser. No. 693,579
Int. Cl. B65g 17/16
U.S. Cl. 198—146                                                    11 Claims

ABSTRACT OF THE DISCLOSURE

A bucket conveyor has wedge shaped buckets shaped and spaced so that their passage around the inside of a curve in the conveyor run of predetermined radius brings their adjacent sides together to enable continuous loading. The buckets are pivotally suspended to one side of a chain guided along the path of the conveyor, the chain preferably being biplanar so that this path can extend through three dimensions. Discharge stations are provided at which the buckets are discharged by tilting about their suspension pivots, whilst the buckets may each have lips on one side interengageable with the adjacent sides of adjacent buckets during loading so as to eliminate spillage.

---

This invention relates to bucket conveyors.

Bucket conveyors of many types are known, the majority comprising an endless chain carrying a plurality of buckets pivotally or otherwise attached to the chain at regular intervals, and extending through a loading station and one or more discharge stations. Such conveyors have the disadvantage that if considerable spillage at the loading station is to be avoided, intermittent operation of the means for filling the buckets must be provided.

It has been proposed to overcome this problem by providing arrangements which enable the buckets to be closed up into abutting relationship at the filling station, for example by temporary shortening of the chain runs between the buckets, but such arrangements necessarily add considerable complexity to and detract from the robustness of the apparatus. Moreover, special difficulties would arise in the application of such an arrangement to conveyors using chains of the biplanar type, which permit a conveyor run to follow a three dimensional path.

The primary object of the invention is to provide a bucket conveyor suitable for continuous loading without spillage in which no provision need be made for shortening the chain runs between the buckets at a filling station, and which can be adapted to follow a three dimensional path.

According to the invention, a conveyor comprises an endless chain, guiding and drive means for the endless chain, a plurality of buckets, the buckets being wedge shaped in plan view and supported at their wider ends from and to one side thereof, and the spacing relative to the chain and the wedge angle of the buckets being such that buckets situated around the inside of a horizontal curve in the chain of predetermined radius will have their adjacent sides in abutment, and a conveyor loading station situated at such a curve.

Preferably, the buckets are pivotally suspended from the chain so as normally to maintain an upright attitude regardless of the direction of movement of the chain, which is preferably of the biplanar type having universally jointed links allowing deflection in both horizontal and vertical direction.

Preferred embodiments of the invention are described below with reference to the accompanying drawings in which.

Figure 1:
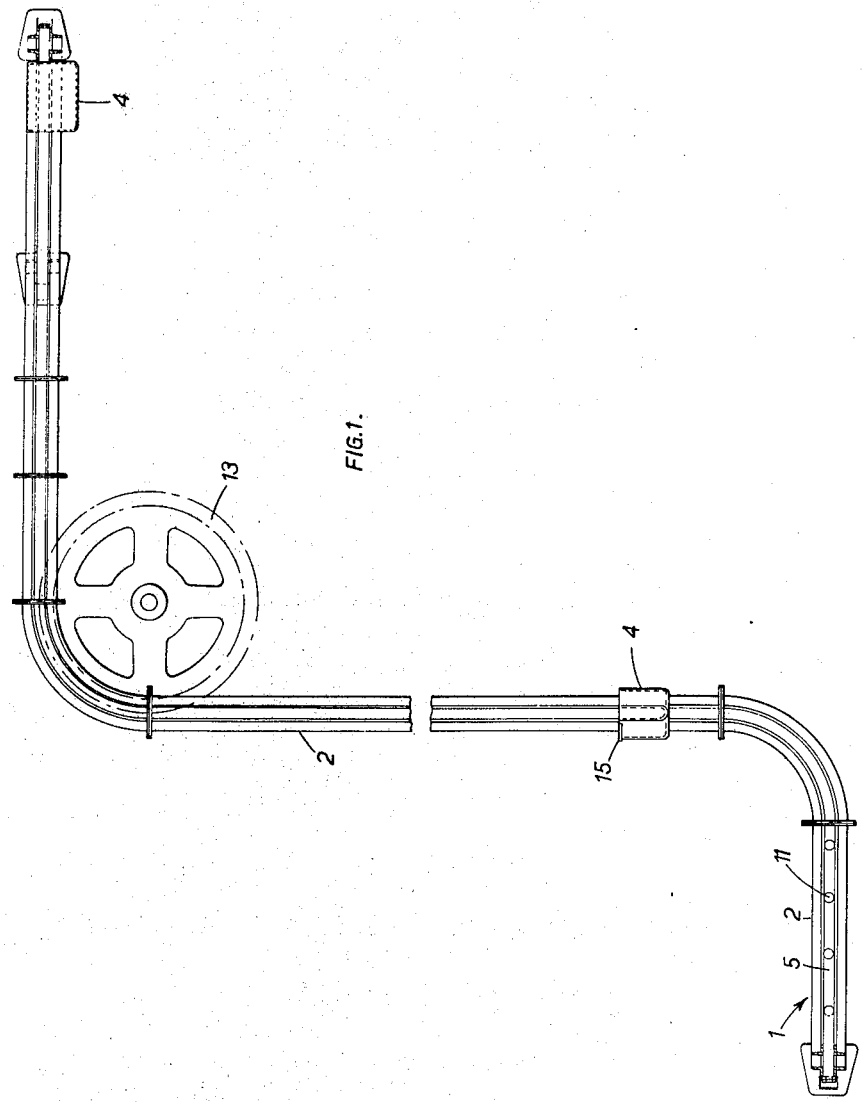
FIGURE 1 is a vertical section through a conveyor system.
Figure 2:
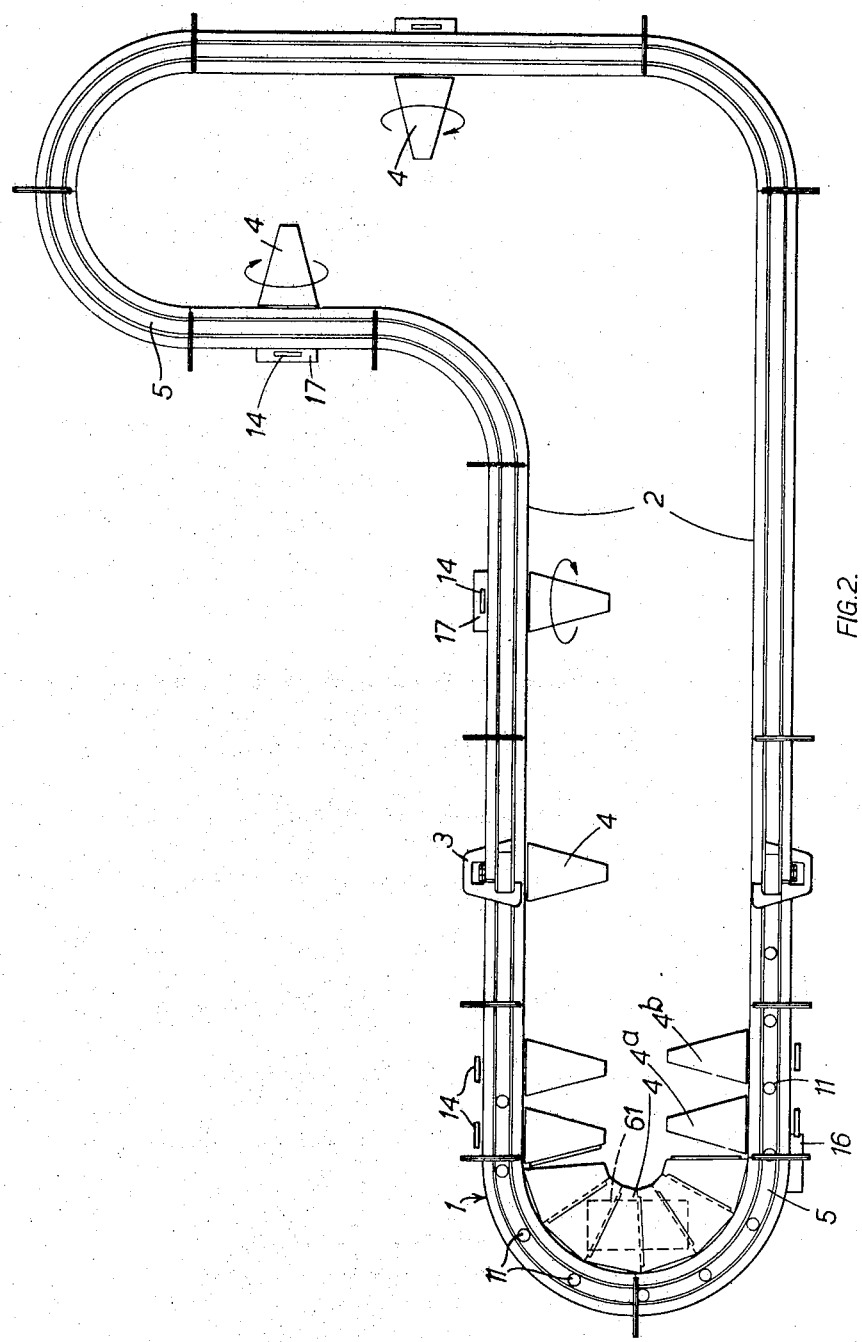
FIGURE 2 is a plan view of the same system.

Referring to FIGURES 1 and 2, a bucket conveyor system is shown including both vertical runs and horizontal runs in various directions. It should be understood that the actual arrangement of the runs will be dictated by requirements and forms no part of the invention except that a sharply curved horizontal run as indicated generally at 1, and fulfilling requirements discussed below must be provided. The conveyor system comprises a continuous track indicated generally at 2, made up of straight or curved sections secured together by means of end flanges or joint plates 3. Within the track runs a biplanar chain 5 from which buckets 4 are pivotally suspended at regular intervals. For the sake of clarity, the majority of the buckets have been omitted from FIGURES 1 and 2, but the normal spacing of such buckets throughout the conveyor will be as shown for the buckets 4a, 4b (FIGURE 2).

As will be seen, the buckets 4 are open topped and wedge shaped in plan, and their spacing and suspension is such that imaginary lines projected along adjacent sides of horizontally adjacent buckets would intersect in vertical alignment with the run of chain 5 connecting them. Hence when the buckets pass around the inside of the horizontal curve 1 in the conveyor which has a radius such that its centre coincides with the intersection of lines projected along the opposite sides of each bucket, the buckets will be in abutting relationship and continuous filling from a chute 61 (FIGURE 2) or the like can take place without excessive spillage.

Figure 3:
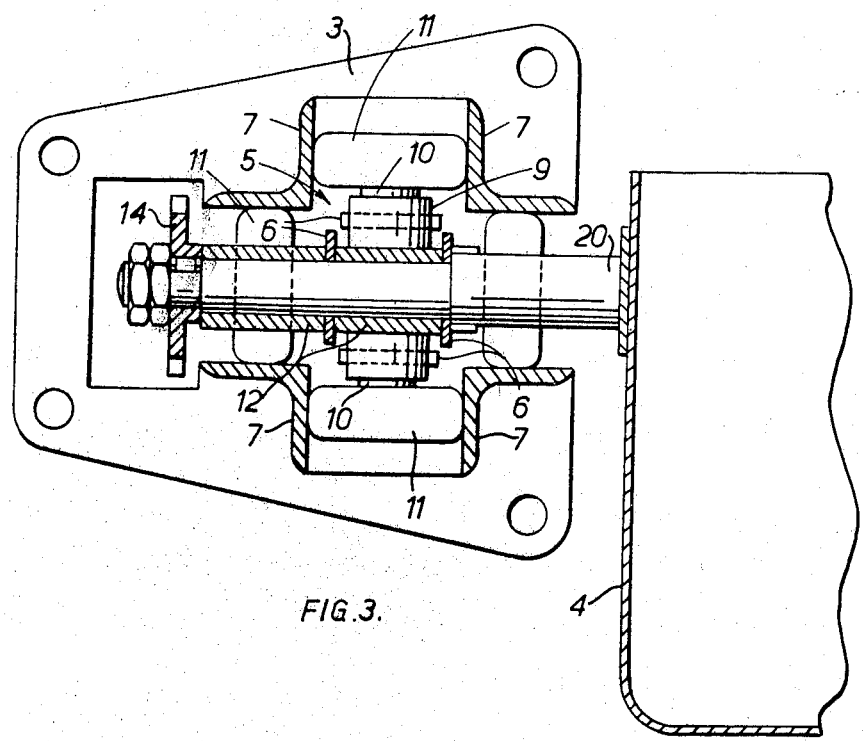
FIGURE 3 shows on an enlarged scale a section through a horizontal run of the conveyor and of a bucket.

Referring now to FIGURE 3, it will be seen that the track comprises four spaced angle sections 7 spaced by means of the joint plates 3 to define a cruciform passage within which is accommodated the biplanar chain 5. This chain comprises successive pairs of parallel links 6 connected by Hooke joints 9, thus providing a connection which permits adjacent links to move relatively to each other in either a horizontal or a vertical plane. The arms 10 of the Hooke joints are extended beyond the links and each carry rollers 11 locating the chain links within the cruciform passage defined by the angle sections 7 for movement therealong. These rollers also transmit the loads imposed on the chain by the buckets to the track.

The chain is hence captive within the track which constrains it to follow the path of the latter, and maintains horizontal the axis of bushes 12 located centrally either of each pair of links 8 or regularly spaced pairs of links.

The chain is driven by a sprocket 13 engaging the links, or alternatively, as is known in the art, may be driven by a caterpillar type drive unit.

Journalled in each bush 12 is a spindle relative 20 carrying at one end one of the buckets 4, and at the other end a sprocket 14, the spindles being arranged so that all the buckets project to one side of the chain. Although the sprocket 14 is shown at the far end of the spindle to the bucket, it will be understood that it could be situated between the bucket 4 and the bush 12.

Figure 4:
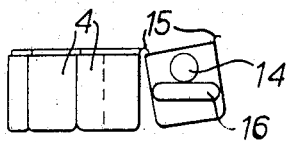
FIGURE 4 is a detail showing buckets approaching the loading station.

One side of each bucket 4 has an outwardly projecting lip 15 (see FIGURE 4) which will overlap the adjacent edge of the next bucket at the filling station 1 so as positively to prevent any loss due to material falling between the buckets. It is preferred to provide for positive engagement between this lip 15 and the edge of the following bucket, and this is achieved by providing a stationary cam member 16, which may be of nylon, secured to the outside of the track at the entry to the curve 1 forming the filling station, this cam member 16 engaging the sprockets 14 of the moving buckets sufficiently to cause the latter to tilt slightly as they pass the cam and to engage their leading edge under the lip of the preceding bucket as soon as the bucket tips back when its associated sprocket is past the cam. It will be readily appreciated that many alternative means could be provided to achieve slight tilting of the buckets as they pass, and the exact nature of such means is not important.

Figure 5:
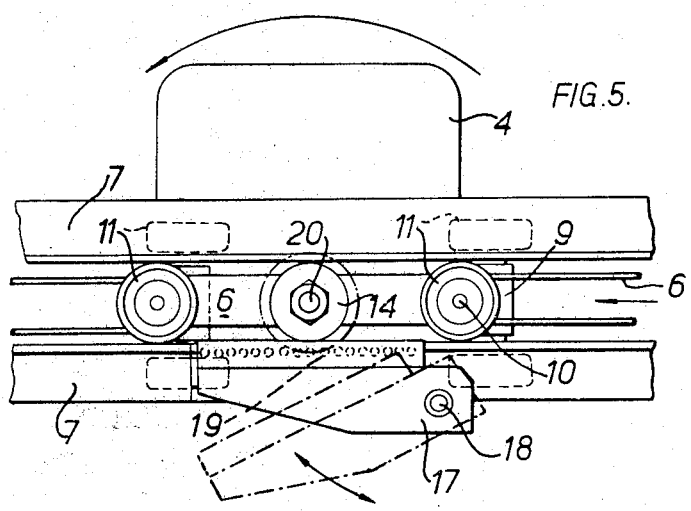
FIGURE 5 is a detail on an enlarged scale of a bucket discharge arrangement.

Discharge of the buckets may be carried out at any point on the conveyor run by providing at the selected point a rack unit 17 as shown in FIGURE 5, this rack unit being secured to the track by a pivot 18, for movement between an operative position in which it presents a rack 19 to the sprockets 14 of the passing buckets, and a retracted position shown in broken lines in which there is no engagement between the rack and the sprockets. As a bucket is moved past a rack unit when the latter is in its operative position, the associated sprocket 14 engages the rack and turns the spindle 20 and hence the bucket 4, causing tipping of the bucket to discharge its contents. By providing means such as a hydraulic ram to move the rack unit 18 in and out of its operative position, it is possible to select particular buckets for discharge. Again, although the arrangement described is preferred, it will be appreciated that there are many possible alternative ways of providing for turning the buckets at the discharge station making use of first actuating means fast to the spindle adapted on movement relative to second actuating means situated at the discharge station to turn the spindle 20.

Figure 6:
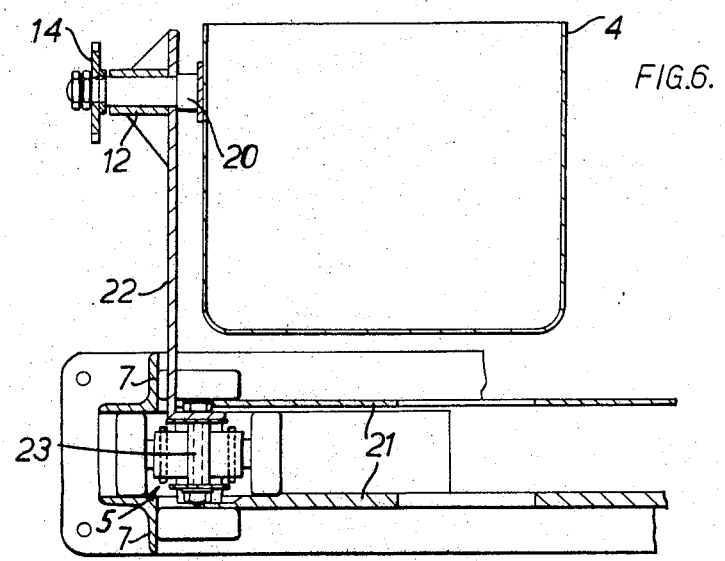
FIGURE 6 is a vertical section through the loading station of a modified form of conveyor.

A modified form of conveyor is illusrated in FIGURE 6, the same reference numerals being used for parts already described in relation to the embodiment of FIGURES 1–5. It may be convenient to situate the conveyor drive at the filling station, and in this case a horizontal driven sprocket 21, of the same radius as the curve at the filling station, is provided engaging the chain 5 at this location. In order to provide clearance for the buckets, the bushes 12 in which the spindles 20 are journalled are carried by pillars 22 secured to the appropriate pairs of links 6 in the chain by bolts 23. As will be seen from the drawing it may be necessary locally to omit the inner angle sections 7 of the track, the chain being located instead by the sprocket.

It should be understood that, within the scope of the appended claims, many modifications besides those already discussed are possible in the apparatus described. For example, if operation in one plane only is desired, it is not necessary to use a biplanar chain, nor need the latter if used necessarily be of the construction described.

It will be appreciated that the construction described possesses a number of advantages over conventional bucket conveyors:

(a) Filling of the buckets is greatly simplified, since they can receive a continuous flow of material.

(b) The capacity of the conveyor can be adjusted either by altering the speed of the conveyor or by installing larger buckets and increasing the radius of the curve at the loading station.

(c) The discharge of the buckets can be carried out by controlled and progressive tipping, allowing accurate and gentle discharge, whilst selective discharge of individual buckets at a number of discharge stations is readily provided for.

(d) The same conveyor can carry buckets along a run containing both horizontal and vertical changes in direction.

What we claim is:

1. A conveyor comprising an endless chain, guiding and drive means for the endless chain, a plurality of buckets, the buckets being wedge shaped in plan view and supported at their wider ends from the chain and to one side thereof, and the spacing relative to the chain and the wedge angle of the buckets being such that buckets situated around the inside of a horizontal curve in the chain of predetermined radius will have their adjacent sides in abutment, and a conveyor loading station situated at such a curve.

2. A conveyor according to claim 1, wherein the buckets are pivotally suspended from the chain so as normally to maintain an upright attitude regardless of the direction of movement of the chain.

3. A conveyor according to claim 2, including at least one bucket discharge station comprising means to tilt said buckets about their pivotal axes to an extent sufficient to discharge their contents.

4. A conveyor according to claim 3, wherein each bucket is pivotally suspended by means of a spindle fast thereto, and a first actuating means is mounted on said spindle and is adapted to engage a second actuating means mounted at said discharge station on movement of the bucket therepast and to rotate said spindle in response to relative movement between said actuating means.

5. A conveyor according to claim 4, wherein said first and second actuating means are a sprocket and a rack respectively.

6. A conveyor according to claim 4 wherein there are a plurality of discharge stations and each said second actuating means is mounted for selevtive withdrawal from its operative position to a retracted position in which it cannot engage said first actuating means.

7. A conveyor according to claim 1 wherein one side of each bucket is provided with a lip adapted to overlie the abutting side of an adjacent bucket at the conveyor loading station.

8. A conveyor according to claim 7, wherein the buckets are pivotally suspended from the chain, and means to tilt each bucket is provided at the entry to the conveyor loading station whereby to facilitate interengagement of said lip with the side of an adjacent bucket.

9. A conveyor according to claim 2 wherein the buckets are suspended by spindles journalled in the links of the chain at spaced locations.

10. A conveyor according to claim 2 wherein the buckets are suspended by spindles journalled in members extending from the chain, said members extending upwardly when the chain is travelling in a horizontal plane sufficient to suspend said buckets above the plane of said chain.

11. A conveyor according to claim 2, wherein the chain is of the biplanar type, and the conveyor follows a three dimensional path.

References Cited

UNITED STATES PATENTS 3,312,333   4/1967   Anderson _____ 198—149 X

EDWARD A. SROKA, Primary Examiner

U.S. Cl. X.R.

198—149